United States Patent
Yamamoto et al.

(10) Patent No.: US 6,961,301 B2
(45) Date of Patent: Nov. 1, 2005

(54) OPTICAL DISK HAVING SYNCHRONIZATION REGION FORMED BETWEEN PRE-RECORDED AREA AND RECORDABLE AREA

(75) Inventors: Takeharu Yamamoto, Osaka (JP); Yoshihiro Kanda, Osaka (JP); Hiroyuki Yamaguchi, Hyogo (JP); Shinji Inoue, Ehime (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 362 days.

(21) Appl. No.: 10/221,682
(22) PCT Filed: Mar. 28, 2001
(86) PCT No.: PCT/JP01/02605
§ 371 (c)(1), (2), (4) Date: Sep. 13, 2002
(87) PCT Pub. No.: WO01/73771
PCT Pub. Date: Oct. 4, 2001

(65) Prior Publication Data
US 2003/0048710 A1 Mar. 13, 2003

(30) Foreign Application Priority Data
Mar. 29, 2000 (JP) ............................. 2000-90338

(51) Int. Cl.$^7$ .............................................. G11B 7/24
(52) U.S. Cl. ................... 369/275.3; 369/47.31
(58) Field of Search ............... 369/275.3, 275.2, 369/47.27, 47.3, 53.2, 53.41, 30.15, 59.25, 275.4

(56) References Cited

U.S. PATENT DOCUMENTS

| | | | | |
|---|---|---|---|---|
| 5,214,627 A | * | 5/1993 | Nakashima et al. | 369/275.3 |
| 5,587,901 A | * | 12/1996 | Yamagami et al. | 369/275.3 |
| 5,859,819 A | | 1/1999 | Miyabe et al. | 369/44.41 |
| 5,923,640 A | * | 7/1999 | Takemura et al. | 369/275.3 |
| 5,953,299 A | * | 9/1999 | Miyamoto et al. | 369/59.2 |
| 6,137,768 A | | 10/2000 | Ishida et al. | |
| 6,163,521 A | * | 12/2000 | Konishi et al. | 369/275.3 |
| 6,310,854 B1 | * | 10/2001 | Sato et al. | 369/275.3 |
| 6,351,449 B1 | * | 2/2002 | Takemoto et al. | 369/275.4 |
| 6,580,678 B2 | * | 6/2003 | Kondo et al. | 369/275.2 |

FOREIGN PATENT DOCUMENTS

| CN | 1234131 A | 3/1999 |
|---|---|---|
| EP | 0 768 648 A1 | 4/1997 |
| WO | 98/19302 | 7/1998 |

* cited by examiner

*Primary Examiner*—Tan Dinh
(74) *Attorney, Agent, or Firm*—Renner, Otto, Boisselle & Sklar, LLP

(57) ABSTRACT

An optical disk of the present invention includes a pre-recorded region in which pre-recorded data is recorded; a recordable region in which a first clock synchronization mark and first address information are recorded; and a synchronization region having a prescribed length which is positioned between the pre-recorded region and the recordable region.

19 Claims, 12 Drawing Sheets

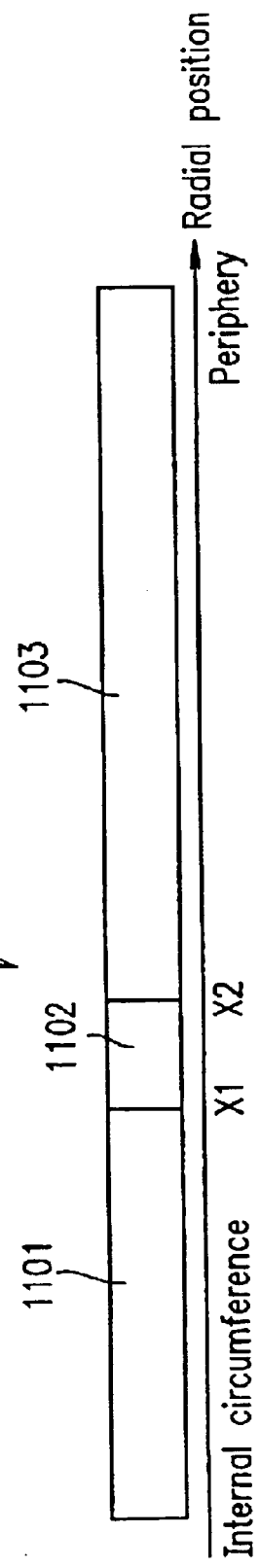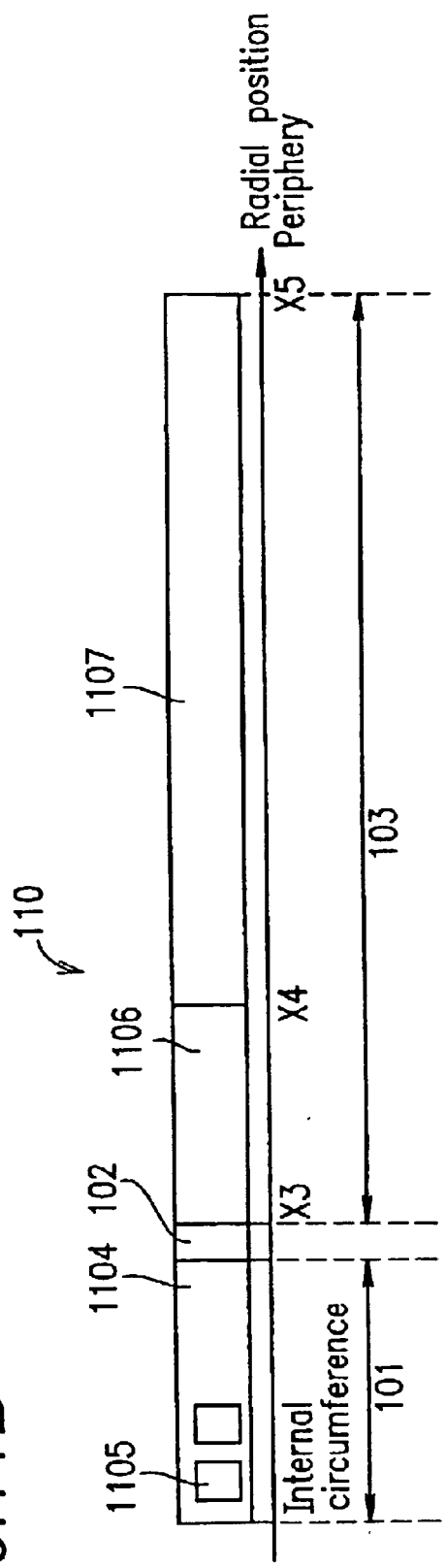
FIG.11A
FIG.11B

OPTICAL DISK HAVING SYNCHRONIZATION REGION FORMED BETWEEN PRE-RECORDED AREA AND RECORDABLE AREA

TECHNICAL FIELD

The present invention relates to an optical disk, and more particularly to a rewritable type optical disk having a pre-recorded region containing pre-recorded data and a recordable data region; and a recording device and a reproducing device for such an optical disk.

BACKGROUND ART

FIGS. 7, 8A and 8B illustrate structures of a conventional optical disk of a recordable type. FIG. 7 illustrates the structure of an optical disk 710 including at least one pre-recorded region 701 and at least one recordable region 703. The pre-recorded region 701 is an unalterable region containing information which has been recorded in the form of embossed pits. The recordable region 703 has a grooved structure.

FIG. 8A illustrates the structure of an information track in the pre-recorded region 701. FIG. 8B illustrates the structure of an information track in the recordable region 703. As illustrated in FIGS. 8A and 8B, an information track 801 in the pre-recorded region 701 and an information track 802 in the recordable region 703 are wobbled. A wobbling frequency component of the information tracks 801 and 802 is extracted for realizing synchronization with a recording clock used for recording information in a portion of the recordable region 703. Address information indicated by reference numeral "804" of FIG. 8A or reference numeral "803" of FIG. 8B is embedded between the information tracks.

The address information (e.g., address information 803 or 804) is embedded so as to synchronize with each ECC (error correcting code) block. By detecting an address signal from the address information, a reproduced position on the optical disk can be known. By recording information on the optical disk in synchronization with the detected address signal, an information recording in synchronization with an ECC block can be attained. The techniques concerning the address signal can be found in a DVD-R standard handbook or the like.

FIG. 9 illustrates a conventional optical disk recording device 900. The optical disk recording device 900 includes a head unit 902, a recording clock synchronization signal (RCSS) reproducing section 903, a recording clock (RC) generation section 904, a data recording section 905, an address detection section 906, a recording control section 907, a tracking error signal (TES) generation section 908, a servo control section 911, and an access control section 912. An optical disk 901 is rotated by a disk motor (not shown).

A light beam emitted from the head unit 902 is reflected on the optical disk 901. The head unit 902 outputs a signal which is in accordance with the reflected light from the optical disk 901. Based on the output of the head unit 902, the TES generation section 908 outputs a tracking error signal representing a deviation of a focusing spot of the light beam from an information track. Based on the tracking error signal output from the TES generation section 908, the servo control section 911 controls the head unit 902 and a focal lens (not shown) mounted on the head unit 902 so that the focusing spot of the light beam is positioned on the information track.

The RCSS reproducing section 903 is used for extracting a wobbling frequency component of the information track. The RC generation section 904 generates a recording clock so as to have a frequency which is a multiple of the frequency component. The address detection section 906 is used for receiving a signal reproduced by the head unit 902 and detecting an address from the address information such as address information 803 of FIG. 8B or address information 804 of FIG. 8A. The recording control section 907 is used for generating a signal with which to start/stop a data recording in accordance with the address detected by the address detection section 906. The data recording section 905 is used for sending to the head unit 902 data to be recorded on an information track of the optical disk 901 in synchronization with a recording clock, which is generated by the RC generation section 904 based on a signal from the recording control section 907.

FIG. 10 is a flow chart illustrating recording operations in the conventional optical disk recording device 900 for recording information in a portion of the recordable region 703 immediately after the pre-recorded region 701. As illustrated in FIG. 10, in order to record information in the portion of the recordable region 703 immediately after the pre-recorded region 701, the access control section 912 sends to the servo control section 911 an instruction to access the pre-recorded region 701 at step S1001. According to the instruction from the servo control section 911, the head unit 902 moves along a radial direction of the optical disk 901 so as to be positioned in the pre-recorded region 701 on the optical disk 901.

At step S1002, the RCSS reproducing section 903 extracts a wobbling frequency component of an information track in the pre-recorded region 701. The RC generation section 904 controls the recording clock so as to have a frequency which is a multiple of the frequency component.

At step S1003, the address detection section 906 detects an address on the optical disk 901 based on a reproduced signal. The recording control section 907 waits until the focusing spot of the light beam reaches the portion of the recordable region 703 immediately after the pre-recorded region 701 based on the address detected by the address detection section 906.

After the focusing spot of the light beam has reached the recordable region 703, the control proceeds to S1004. The recording control section 907 sends a signal to the data recording section 905. The data recording section 905 sends to the head unit 902 a data to be recorded on an information track of the optical disk 901 in synchronization with a recording clock which is generated by the RC generation section 904 based on the signal from the recording control section 907.

In recent years, recordable optical disks have come into wide use. An optical disk structure such that information which is specific to each optical disk is recorded in an unalterable pre-recorded region has been proposed in consideration of copyright protection.

In such an optical disk, a pre-recorded region does not include any information which can be used for recording clock synchronization (i.e., a wobbling structure of the above-described information tracks 801 or 802) in order to stably reproduce the aforementioned optical disk-specific information. Therefore, in the conventional optical disk and optical disk recording device, when recording information in a portion of a recordable region immediately after the pre-recorded region, the recording clock cannot be established with a prescribed frequency since no information for synchronizing the recording clock is provided in the pre-recorded region, so that it is impossible to record information at a beginning portion of the recordable region.

DISCLOSURE OF THE INVENTION

According to one aspect of the invention, an optical disk includes: a pre-recorded region in which pre-recorded data is recorded; a recordable region in which a first clock synchronization mark and first address information are recorded; and a synchronization region having a prescribed length which is positioned between the pre-recorded region and the recordable region.

In the synchronization region, a second clock synchronization mark and second address information, which are respectively identical in structure to the first clock synchronization mark and the first address information, may be recorded.

In the synchronization region, a second clock synchronization mark which is identical in structure to the first clock synchronization mark may be recorded and the synchronization region may be adapted for synchronizing a recording clock with a reproducing signal of the second clock synchronization mark, in which the recording clock is adapted for recording data in the recordable region.

A width of the synchronization region along a radius direction may be equal to or greater than that of a region including four information tracks of the optical disk along a radius direction.

The pre-recorded data in the pre-recorded region may include information indicating prescribed properties of the optical disk.

The recordable region may include a data region in which data is to be recorded and a buffering region positioned between the pre-recorded region and the data region.

A start address of the data region in the recordable region may be identical to a start address of a data region in a predetermined read only optical disk.

A start address of the buffering region in the recordable region may be identical to a start address of a buffering region in the predetermined read only optical disk.

A start address of the buffering region in the recordable region may lie more internally than a start address of a buffering region of the predetermined read only optical disk.

A radial start position of the data region in the recordable region may be identical to a radial start position of a data region of a predetermined read only optical disk.

A radial start position of the buffering region in the recordable region may be identical to a radial start position of a buffering region of the predetermined read only optical disk.

A radial start position of the buffering region in the recordable region may lie more internally than a radial start position of a buffering region of the predetermined read only optical disk.

According to another aspect of the invention, an optical disk device includes: a transducer means for reproducing first information from an optical disk and for recording second information on the optical disk, in which the optical disk may include a pre-recorded region in which pre-recorded data is recorded, a recordable region in which a clock synchronization mark and address information are recorded, and a synchronization region having a prescribed length positioned, and being between the pre-recorded region and the recordable region, and the first information may include a clock synchronization mark recorded in the synchronization region, and the transducer means may be adapted to convert the clock synchronization mark into a clock synchronization signal and output a first signal including the clock synchronization signal; a control section for controlling the transducer means; a clock synchronization signal reproducing section for extracting the clock synchronization signal from the first signal; a record clock generation section for generating a recording clock signal which is in synchronization with the clock synchronization signal; a data recording section for outputting to the transducer means a second signal corresponding to the second information which is in synchronization with the recording clock signal; an address detection section for detecting an address signal from the first signal; and a recording control section for controlling the data recording section based on the address signal to control a recording start position and recording end position of the optical disk.

The control section may be adapted to control tracking based on a phase difference tracking error signal during reproducing information recorded in the pre-recorded region and to control tracking based on a push-pull tracking error signal during reproducing information recorded in the synchronization region.

The pre-recorded region may include control data, and the control section may be adapted to switch the transducer means so as to reproduce or not reproduce information in the synchronization region based on the control data.

The pre-recorded region may include control data and the recording control section may change a recording start position of the recordable region based on the control data.

The pre-recorded region may include control data and the data recording section may be adapted to perform, when a synchronization signal and an address signal are detected during reproduction of the control data, a synchronization operation during reproducing the control data.

According to still another aspect of the invention, an optical disk device includes: means for reproducing first information from an optical disk including a pre-recorded region in which pre-recorded data is recorded, a recordable region in which a clock synchronization mark and address information are recorded, and a synchronization region having a prescribed length positioned and being between the pre-recorded region and the recordable region, and the optical disk device may be adapted so as not to reproduce second information recorded in the synchronization region.

The pre-recorded region may include control data, and the optical disk device may include means for reproducing, after reproducing the control data, third information recorded in the recordable region by skipping the synchronization region based on the control data.

An optical disk according to the present invention includes a recording clock synchronization (RCS) region between a pre-recorded region and a recordable region. The RCS region may be a recordable or unrecordable region.

When recording information on the optical disk including the RCS region between the pre-recorded region and the recordable region, an optical disk recording device according to the present invention establishes clock signal synchronization by reproducing the RCS region prior to recording the information in a portion of the recordable region.

When reproducing information recorded on the optical disk including the RCS region between the pre-recorded region and the recordable region, an optical disk reproducing device according to the present invention does not reproduce information recorded in the RCS region.

Thus, the invention described herein makes possible the advantages of providing: (1) an optical disk which can stably record information from a beginning portion of a recordable region even if there is no information for synchronizing recording clock in a pre-recorded region; and (2) a recording device and a reproducing device for such an optical disk.

These and other advantages of the present invention will become apparent to those skilled in the art upon reading and understanding the following detailed description with reference to the accompanying figures.

BRIEF DESCRIPTION OF THE DRAWINGS

FIG. 11A illustrates an arrangement of regions along a radius direction of a read only optical disk 110' according to Example 1 of the present invention.

FIG. 11B illustrates an arrangement of regions along a radius direction of an optical disk 110 according to Example 1 of the present invention.

BEST MODE FOR CARRYING OUT THE INVENTION

Hereinafter, embodiments of the present invention will be described.

EXAMPLE 1

An optical disk 110 according to Example 1 of the present invention will be described with reference to FIGS. 1, 2A, 2B, and 2C.

Figure 1:
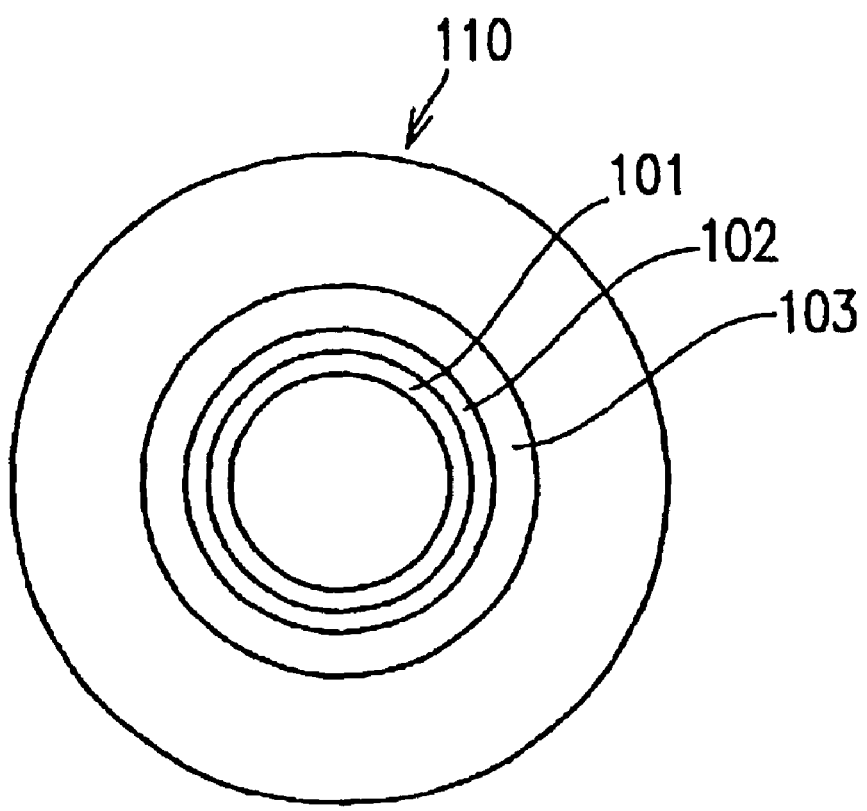
FIG. 1 illustrates an optical disk according to an example of the present invention.

FIG. 1 illustrates the optical disk 110. The optical disk 110 includes an unalterable pre-recorded region 101 containing information which has been recorded in the form of embossed pits during a manufacturing process, and a recordable region 103 including at least a mark used for clock synchronization (hereinafter, referred to as "a clock synchronization mark") and address information, in which information can be recorded based on a grooved structure. A recording clock synchronization (RCS) region 102 is provided between the pre-recorded region 101 and the recordable region 103 which is positioned immediately after the pre-recorded region 101. The RCS region 102 includes at least a clock synchronization mark and address information. Information recording is not performed in the RCS region 102 according to Example 1 of the present invention.

The RCS region 102 is a synchronous region for synchronizing a recording clock used for recording information in the recordable region 103 with a signal reproduced from the clock synchronization mark in the RCS region 102.

Although not shown in FIG. 1 for the purpose of clarity, information tracks in the pre-recorded region 101, the RCS region 102, and the recordable region 103 are formed in a spiral shape, as will be described below.

When writing information to an information track in the recordable region 103, a light beam is emitted while being focused on the information track so as to locally induce a thermal or photochemical change in the recording layer due to light absorption.

Figure 2A:
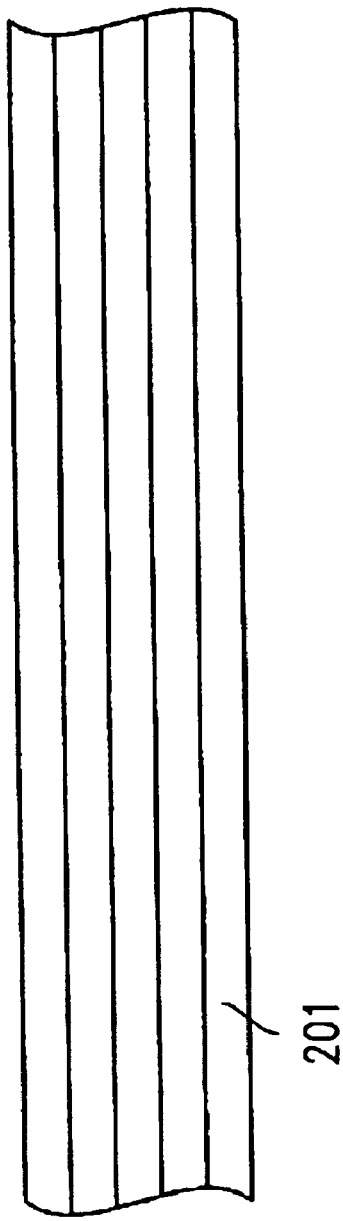
FIGS. 2A through 2C illustrate information tracks of an optical disk according to an example of the present invention.
Figure 2B:
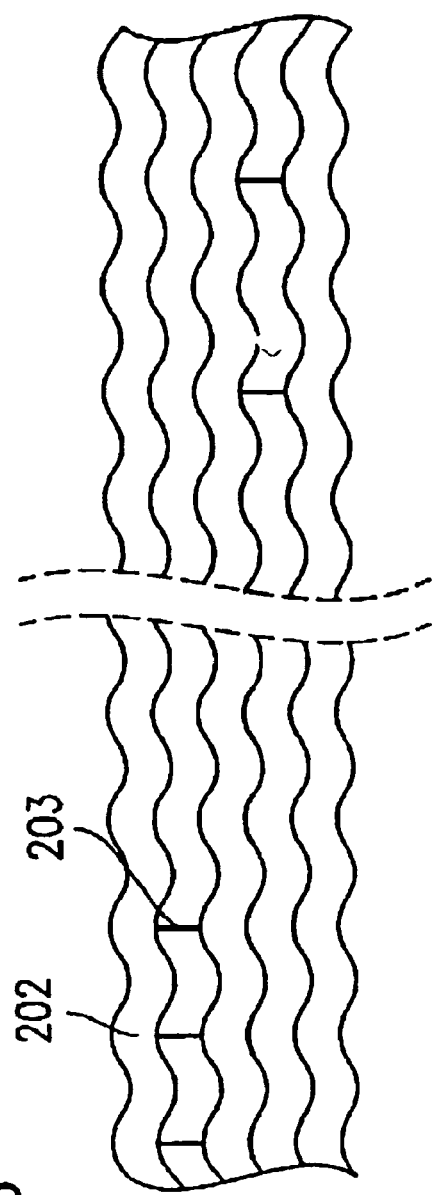

FIGS. 2A and 2B illustrate the information tracks of the optical disk 110. FIG. 2B illustrates the information tracks in the RCS region 102 and the recordable region 103. The information track 202 shown in FIG. 2B is wobbled with a frequency which is different from a frequency component of data to be recorded, and is used as a clock synchronization mark. The frequency of the recording clock is several dozen to several hundred times greater than the wobbling frequency of the information track 202. When recording the information, the wobbling frequency component is detected as a clock synchronization signal to generate the recording clock so as to have a frequency which is a multiple of the wobbling frequency, thereby recording the record information in synchronization with the recording clock in the recordable region 103 of the optical disk 110.

FIG. 2A illustrates information tracks 201 in the pre-recorded region 101. As illustrated in FIG. 2A, the information tracks are not wobbled. Alternatively, the information tracks 201 in the pre-recorded region 101 may be wobbled, as will be described below.

Figure 2C:
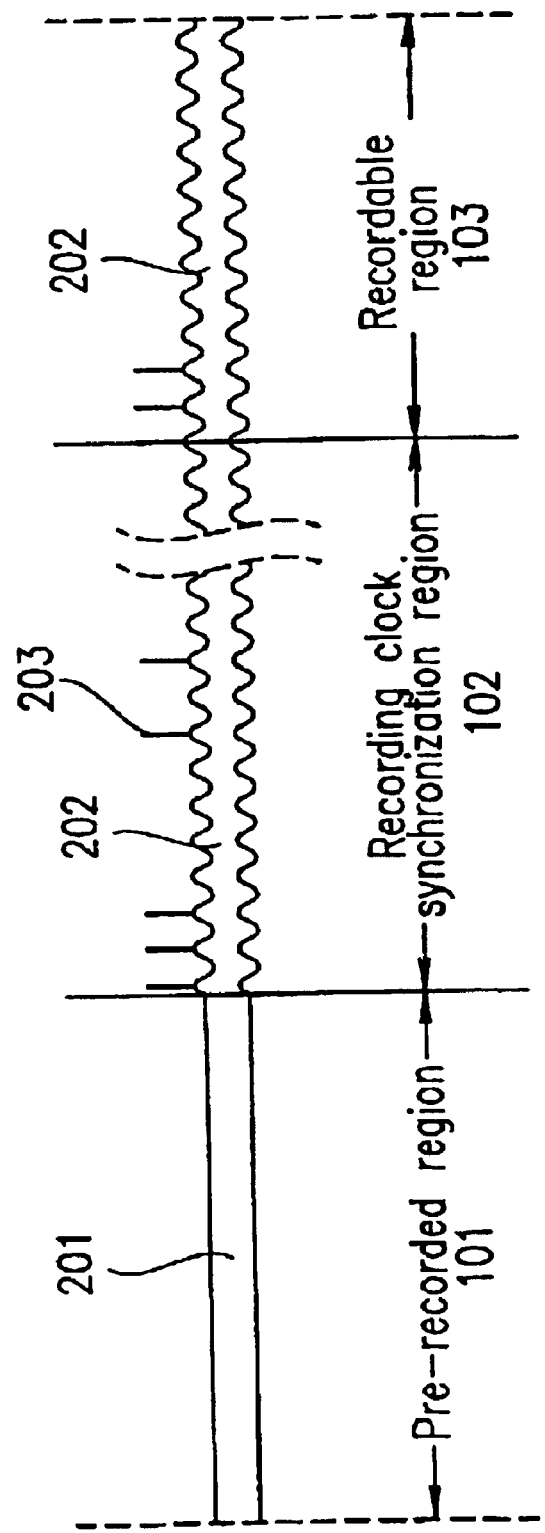

FIG. 2C illustrates the information track 201 in the pre-recorded region 101 and the information track 202 in the RCS region 102 and the recordable region 103. The information tracks 201 and 202 are formed spirally and connected to each other as illustrated in FIG. 2C.

The RCS region 102, which includes the same type of information track 202 as does the recordable region 103 may have a grooved structure similar to that of the recordable region 103. Alternatively, the RCS region 102 may contain pre-recorded data in the form of embossed pits. In this case, the embossed pits in the RCS region 102 are formed so as to be relatively shallow, i.e., just deep enough to allow the address information 203 to be recorded therein, so that address information, which cannot be recorded in the pre-recorded region of a conventional optical disk, can be recorded in the RCS region 102.

The address information 203 indicating a location on the optical disk 110 (a plurality of which are shown in FIG. 2C) is pre-recorded between the information tracks 202 in the RCS region 102 or in the recordable region 103. A location on the optical disk 110 can be known from the address information 203 at the time of recording.

As illustrated in FIG. 2B, the address information 203 is positioned at each peak of the wobbles of the information track 202.

In order to record information in the recordable region 103, the recording clock must generally be synchronized to a prescribed frequency. However, the pre-recorded region 101 includes no information available for the purpose of recording clock synchronization. Therefore, in order to record information in the portion of the recordable region 103 positioned after the pre-recorded region 101, a wobbling frequency component of the information track 202 in the RCS region 102 is detected for establishing recording clock synchronization with the wobbling frequency component. Then, upon detecting that a focusing spot of the light beam has moved along the spiral information tracks from the RCS region 102 to the recordable region 103 based on the address information 203, recording is started.

The RCS region 102 has a length such that the time required for the focusing spot of the light beam, which has just entered the RCS region 102, to move along the spiral information track 202 across the entire RCS region 102 is equal to or longer than the time required for the recording clock to be controlled so as to have a frequency which is a multiple of the wobbling frequency of the information track 202 after the focusing spot of the light beam enters the RCS region 102. For example, a width of the RCS region 102 along a radius direction may be prescribed to be equal to or greater than a width (along the radius direction) of a region of the optical disk 110 where there are four of the information tracks 202.

Prescribing the length and the width to such values makes it possible to record the record information from the beginning portion of the recordable region 103 because the recording clock is controlled so as to have a prescribed frequency in the RCS region 102.

With reference to FIGS. 11A and 11B, the interchangeability of user data regions between the optical disk 110 according to the present invention and a prescribed unalterable read only optical disk 110' in which the entire region has been pre-recorded will be described. FIG. 11A illustrates an arrangement along a radius direction of various regions of the read only optical disk 110'. FIG. 11B illustrates an arrangement along a radius direction of various regions of the optical disk 110 according to the present invention.

In the optical disk 110 illustrated in FIG. 11B, the pre-recorded region 101 includes a control data region 1104 in which control data 1105 (i.e., disk-specific information representing certain features of the optical disk 110) is recorded, e.g., size of the optical disk 110 and information regarding whether the optical disk 110 is recordable or a read only disk. The recording clock synchronization region 102 is provided between the pre-recorded region 101 and the recordable region 103. The recordable region 103 includes a user data region 1107 and a buffering region 1106, which is located between the user data region 1107 and the control data region 1104. As illustrated in FIG. 11A, the prescribed unalterable read only optical disk 110' in which the entire region has been pre-recorded includes the control data region 1101, a buffering region 1102 and a user data region 1103. By ensuring that a radial start position x2 of the user data region 1103 in the read only optical disk 110' is identical to a radial start position x4 of the user data region 1107 in the optical disk 110 according to the present invention, interchangeability between the user data regions 1103 and 1107 can be obtained.

In the above-described case, while the radial start positions x2 and x4 of the user data regions 1103 and 1107 are set at the same location, the radial start position x3 of the buffering region 1106 according to the optical disk 110 of the present invention may also be set at the same location as the radial start position x1 of the buffering region 1102 of the predetermined read only optical disk 110'. As a result, interchangeability between the buffering regions 1102 and 1106 can be obtained.

In the above-described case, while the radial start positions x2 and x4 of the user data regions 1103 and 1107 are set at the same location, the radial start position x3 of the buffering region 1106 according to the optical disk 110 of the present invention may lie more internally than the radial start position x1 of the buffering region 1102 of the predetermined read only optical disk 110', and the width of the buffering region 1106 may be made equal to or greater than the magnitude of a possible accessing error when accessing the beginning portion of the user data region 1107. As a result, when accessing the user data region 1107, the focusing spot of the light beam is prevented from being positioned in the RCS region 102 in which no data is recorded, due to accessing error in the user data region 1107.

Also, in an optical disk reproducing device using a phase differential tracking error signal (PDTES) for tracking control, the focusing spot of the light beam can be prevented from being inadvertently positioned in the RCS region 102 where no data is recorded, in which case the optical disk reproducing device would malfunction because no PDTES would be generated and thus, tracking servo control would become impossible.

Figure 12A:
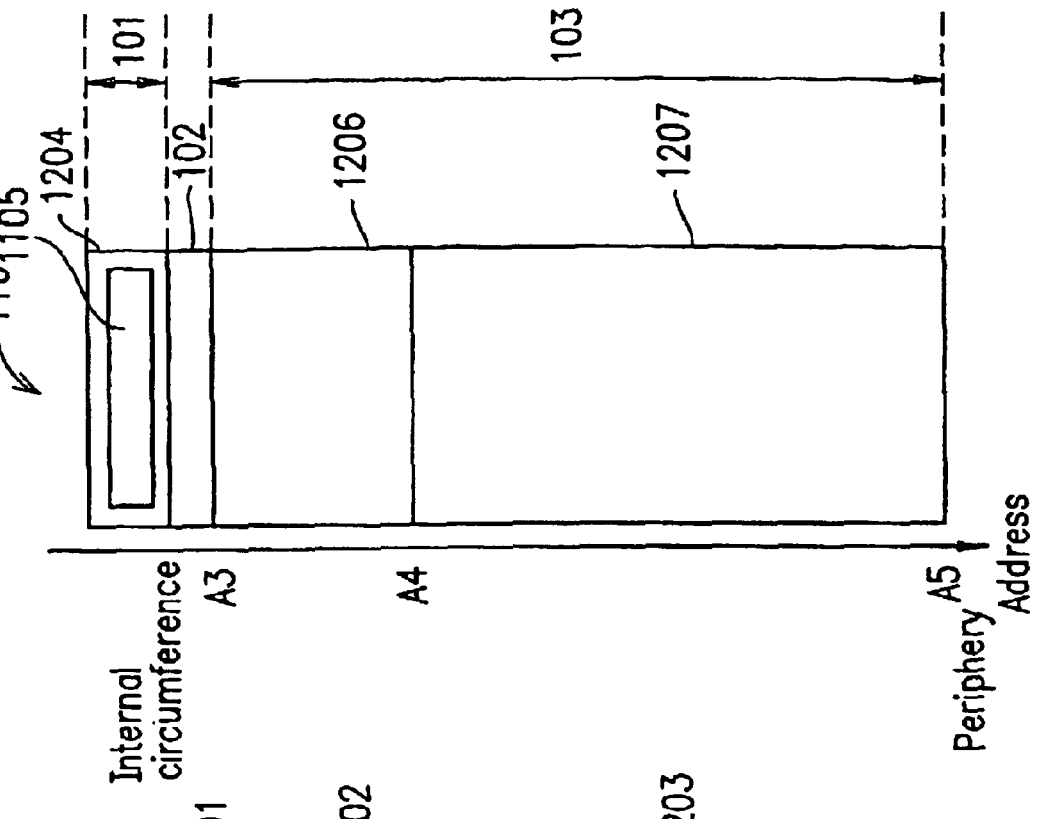
FIG. 12A illustrates an address arrangement of regions of a read only optical disk 110' according to an example of the present invention.
Figure 12B:
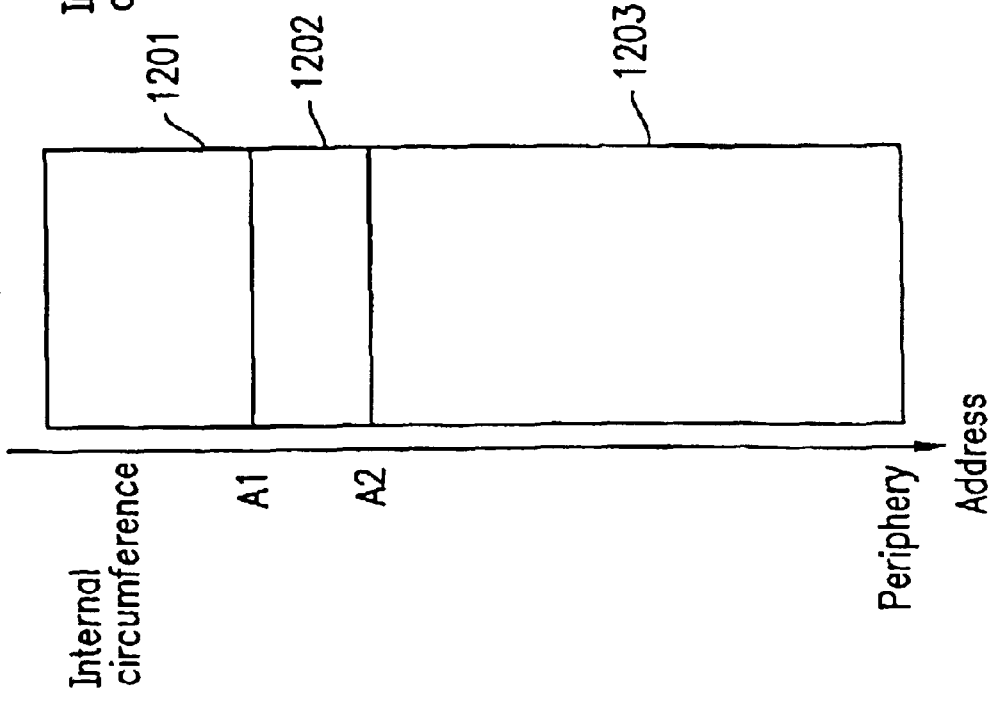
FIG. 12B illustrates an address arrangement of regions of the optical disk 110 according to an example of the present invention.

With reference to FIGS. 12A and 12B, another embodiment for realizing interchangeability of user data regions between the optical disk 110 according to the present invention and a prescribed unalterable read only optical disk 110' in which the entire region has been pre-recorded will be described. FIG. 12A illustrates an arrangement of address positions for various regions of the read only optical disk 110'. FIG. 12B illustrates an arrangement of address positions for various regions of the optical disk 110 according to the present invention.

In the optical disk 110 illustrated in FIG. 12B, the pre-recorded region 101 includes a control data region 1204 in which control data 1105 (i.e., disk-specific information representing certain features of the optical disk 110) is recorded, e.g., size of the optical disk 110 and information regarding whether the optical disk 110 is recordable or a read only disk. The recording clock synchronization region 102 is provided between the pre-recorded region 101 and the recordable region 103. The recordable region 103 includes a user data region 1207 and a buffering region 1206, which is located between the user data region 1207 and the control data region 1204. As illustrated in FIG. 12A, the prescribed unalterable read only optical disk 110' in which the entire region has been pre-recorded includes the control data region 1201, a buffering region 1202 and a user data region 1203. By ensuring that a start address A2 of the user data region 1203 in the read only optical disk 110' is identical to a start address A4 of the user data region 1207 in the optical disk 110 according to the present invention, interchangeability between the user data regions 1203 and 1207 can be obtained.

In the above-described case, while the start address A2 and A4 of the user data regions 1203 and 1207 are set to be the same, the start address A3 of the buffering region 1206 according to the optical disk 110 of the present invention may also be the same as the start address A1 of the buffering region 1202 of the predetermined read only optical disk 110'. As a result, interchangeability between the buffering regions 1202 and 1206 can be obtained.

In the above-described case, while the start addresses A2 and A4 of the respective user data regions 1203 and 1207 are set to be the same, the start address A3 of the buffering region 1206 according to the optical disk 110 of the present invention may lie more internally than the start address A1 of the buffering region 1202 of the predetermined read only optical disk 110', and the width of the buffering region 1206 may be made equal to or greater than the magnitude of a possible accessing error when accessing the beginning portion of the user data region 1207. As a result, when accessing the user data region 1207, the focusing spot of the light beam is prevented from being positioned in the RCS region 102 in which no data is recorded, due to accessing error in the user data region 1207.

Also, in an optical disk reproducing device using a PDTES for the tracking control, when the focusing spot of the light beam can be prevented from being inadvertently positioned in the RCS region 102 where no data is recorded, in which case the optical disk reproducing device would malfunction because no PDTES would be generated and thus, tracking servo control would become impossible.

In the above-described case, the information track 201 in the pre-recorded region 101 is illustrated as not being wobbled. However, even if the information track 201 is wobbled, the present invention is still applicable in the case where address information 203 does not exist and the address information 203 needs to be utilized for timing the recording of information.

A plurality of the pre-recorded regions 101, RCS regions 102, and recordable regions 103 may be provided in the optical disk 110 at predetermined intervals.

EXAMPLE 2

An optical disk recording device 300 according to Example 2 of the present invention will be described with reference to FIGS. 1, 3 and 4.

Figure 3:
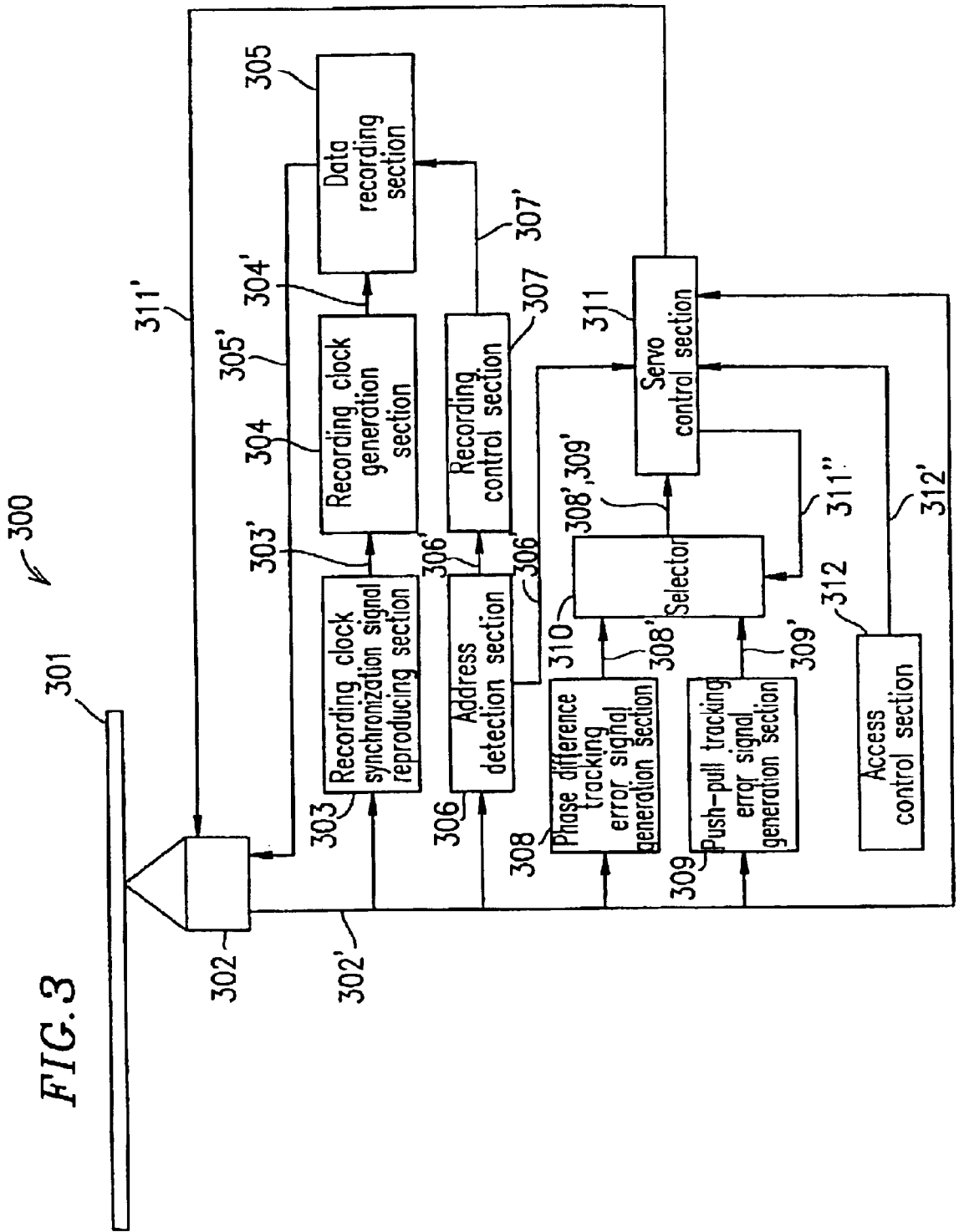
FIG. 3 is a block diagram illustrating a configuration of an optical disk recording device 300 according to an example of the present invention.

FIG. 3 is a block diagram of the optical disk recording device 300 of the present invention. The optical disk recording device 300 includes a head unit 302 as a transducer means, a recording clock synchronization signal (RCSS) reproducing section 303, a recording clock (RC) generation section 304, a data recording section 305, an address detection section 306, a recording control section 307, a phase difference tracking error signal (PDTES) generation section 308, a push-pull tracking error signal (PPTES) generation section 309, a selector 310, a servo control section 311, and an access control section 312.

With reference to FIG. 3, a light beam emitted from the head unit 302 which is movable along a disk radius direction is reflected on the optical disk 301. The head unit 302 outputs a signal 302' which is in accordance with the reflected light from the optical disk 301. The optical disk 301 is identical to the optical disk 110 shown in FIG. 1. The PDTES generation section 308 and the PPTES generation section 309 output a PDTES 308' representing a deviation of a focusing spot of the light beam from the information track 201 or 202, and a PPTES 309', respectively, based on the output (signal 302') of the head unit 302.

When the focusing spot of the light beam is positioned in the pre-recorded region 101, the servo control section 311 outputs a signal 311" to the selector 310 so as to select the PDTES 308'. When the focusing spot of the light beam is positioned in the recordable region 103 which has a grooved structure, the servo control section 311 outputs a signal 311" to the selector 310 so as to select the PPTES 309'. The selector 310 selects the PDTES 308' or the PPTES 309' and outputs the selected signal (the PDTES 308' or the PPTES 309') to the servo control section 311. The servo control section 311 controls the head unit 302 and a focal lens (not shown) mounted on the head unit 302 based on the output of the selector 310 so that the focusing spot of the light beam is positioned in the information tracks 201 or 202.

The RCSS reproducing section 303 extracts a wobbling frequency component of the information track 202 in the RCS region 102 and the recordable region 103 based on the output of the head unit 302. The RC generation section 304 generates a recording clock so as to have a frequency which is a multiple of the wobbling frequency component based on the output (signal 303') of the RCSS reproducing section 303. The address detection section 306 detects the address information 203 on the optical disk 301 illustrated in FIG. 2B as the address signal 306' based on the output of the head unit 302. The recording control section 307 controls the recording operation by the data recording section 305, thereby controlling a recording start position (e.g., a radial start position x3 and start address A3 respectively illustrated in FIGS. 11B and 12B) and a recording end position (e.g., an end radius position x5 and end address A5 respectively illustrated in FIGS. 11B and 12B) of the optical disk 301. The data recording section 305 sends the data 305' to the head unit 302 based on the signal 307' from the recording control section 307 in synchronization with a recording clock generated by the RC generation section 304. The head unit 302 records the data 305' on the information track 202 of the optical disk 301.

Figure 4:
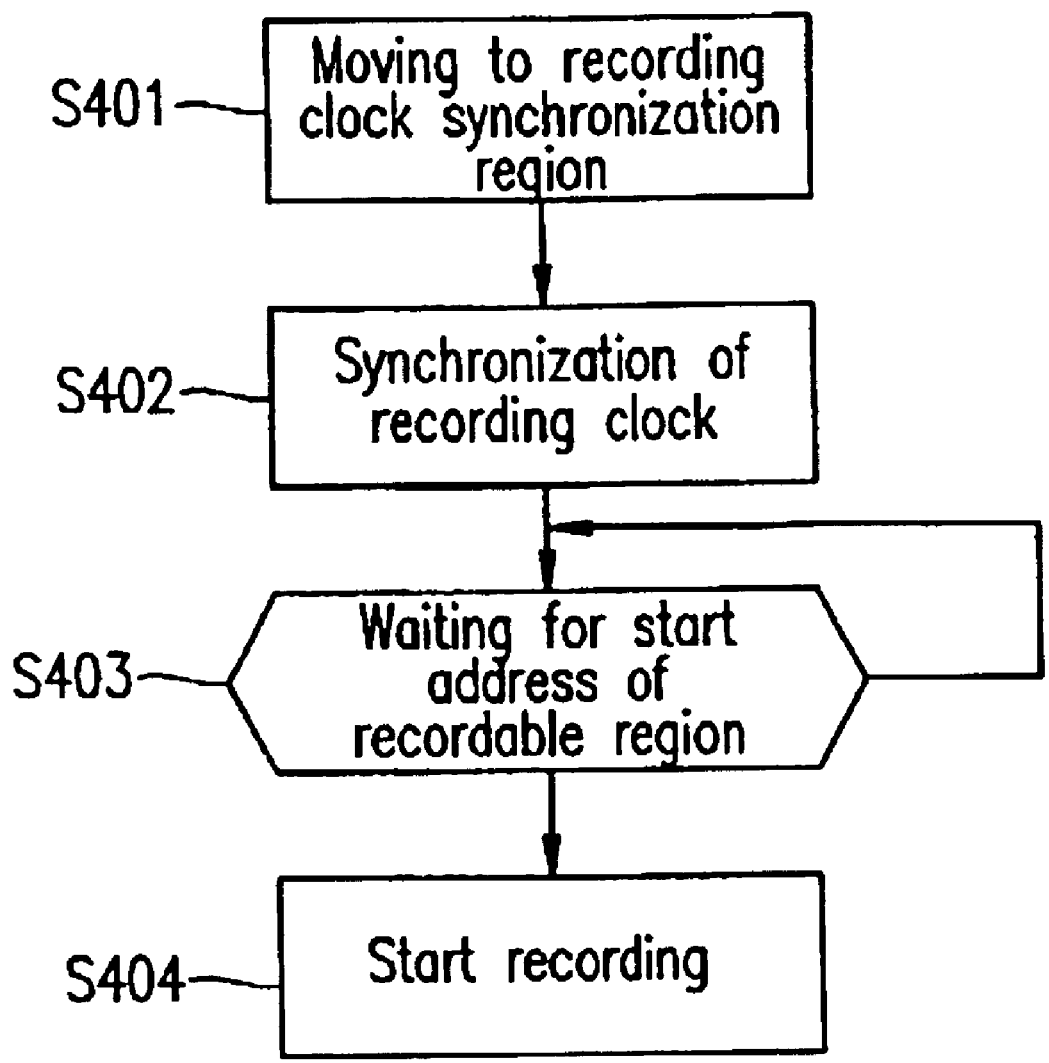
FIG. 4 is a flow chart illustrating a recording operation for an optical disk according to an example of the present invention.

FIG. 4 is a flow chart showing the operation of recording information in a portion of the recordable region 103 positioned after the pre-recorded region 101 of the optical disk 301.

At step S401, the access control section 312 sends to the servo control section 311 an instruction (signal 312') to access the RCS region 102 immediately after the pre-recorded region 101. The head unit 302 is moved along the radius direction of the optical disk 301 according to the instruction from the servo control section 311 (signal 311') so as to position the focusing spot of the light beam in the RCS region 102 of the optical disk 301. At this point, the servo control section 311 sends the instruction to the selector 310 so as to select the PPTES 309' which is the output of the PPTES generation section 309. The focusing spot of the light beam is controlled to be positioned in the information track 202 in the RCS region 102.

Following the above procedure, at step S402, the RCSS reproducing section 303 extracts a wobbling frequency component of the information track in the RCS region 102 as a clock synchronization signal 303' from the signal 302' of the head unit 302. The RC generation section 304 controls the recording clock based on the RCS signal 303' output from the RCSS reproducing section 303 so as to have a frequency which is a multiple of the wobbling frequency component.

At step S403, the address detection section 306 detects a signal indicating an address on the optical disk 301 as an address signal 306' based on the output of the head unit 302 (signal 302'). The recording control section 307 waits until the focusing spot of the light beam moves across the spiral information track 202 to reach the portion of the recordable region 103 immediately after the RCS region 102. When the focusing spot has reached the recordable region 103, at step S404, the recording control section 307 sends the signal 307' to the data recording section 305. The data recording section 305 sends the data 305' to the head unit 302 based on the signal 307' from the recording control section 307 so as to record the data 305' on the information track 202 in the recordable region 103 in synchronization with the recording clock signal 304' generated by the RC generation section 304.

Thus, it is possible to establish recording clock synchronization before starting the recording, even on the optical disk 301 in which it is not possible to establish recording clock synchronization in the pre-recorded region 101. As a result, information can be stably recorded from the beginning portion of the recordable region 101.

In order to record information on the optical disk 301 in which start position information in the RCS region 102 is recorded as a control data 1105 in a control data region 1104 (FIG. 11B) and a control data region 1204 (FIG. 12B) in the pre-recorded region 101, the PDTE signal 308' is used to reproduce the information recorded in the pre-recorded region 101 in advance and store the start position information in the RCS region 102 in the disk recording device 300.

In order to record information in a portion of the recordable region 103 immediately after the pre-recorded region 101, an RCS region 102 is accessed based on the stored start position information so as to synchronize the RC signal, and information is recorded from a recording start point in the recordable region 103 (e.g., a radial start position x3 and a start address A3 respectively illustrated in FIGS. 11B and 12B) following the RCS region 102. Thus, data can be stably recorded in optical disks having the RCS region 102 located in different positions by changing the recording start position by means of the RCS region 102.

When the control data 1105 in the pre-recorded region 101 is reproduced, a clock synchronization signal 303' and an address signal 306' are detected as a portion of the control data 1105. In order to record data 305' in the recordable region 103 immediately after the pre-recorded region 101, the data recording section 305 may synchronize the recording clock signal 304' with the data 305' to be recorded while reproducing information in the pre-recorded region 101 in synchronization operations, and thereafter, record the data 305'. The data 305' can be recorded on the conventional optical disk in the same manner.

In order to record information on the optical disk 301 in which the pre-recorded region 101 includes the control data 1105 indicating whether or not there is an RCS region 102, information in the pre-recorded region 101 is reproduced in advance so as to determine whether or not there is the RCS region 102, and the servo control section 311 may switch the head unit 302 so as to accordingly reproduce or not reproduce information in the RCS region 102 to be performed for a recording clock synchronization operation to occur. Thus, information can be recorded even on an optical disk which does not include the RCS region 102.

Instead of the PPTE signal, a tracking error signal in any other format, e.g., a differential push-pull (DPP) tracking error signal, may be used.

EXAMPLE 3

An optical disk reproducing device 500 according to Example 3 of the present invention will be described with reference to FIGS. 1, 5 and 6.

Figure 5:
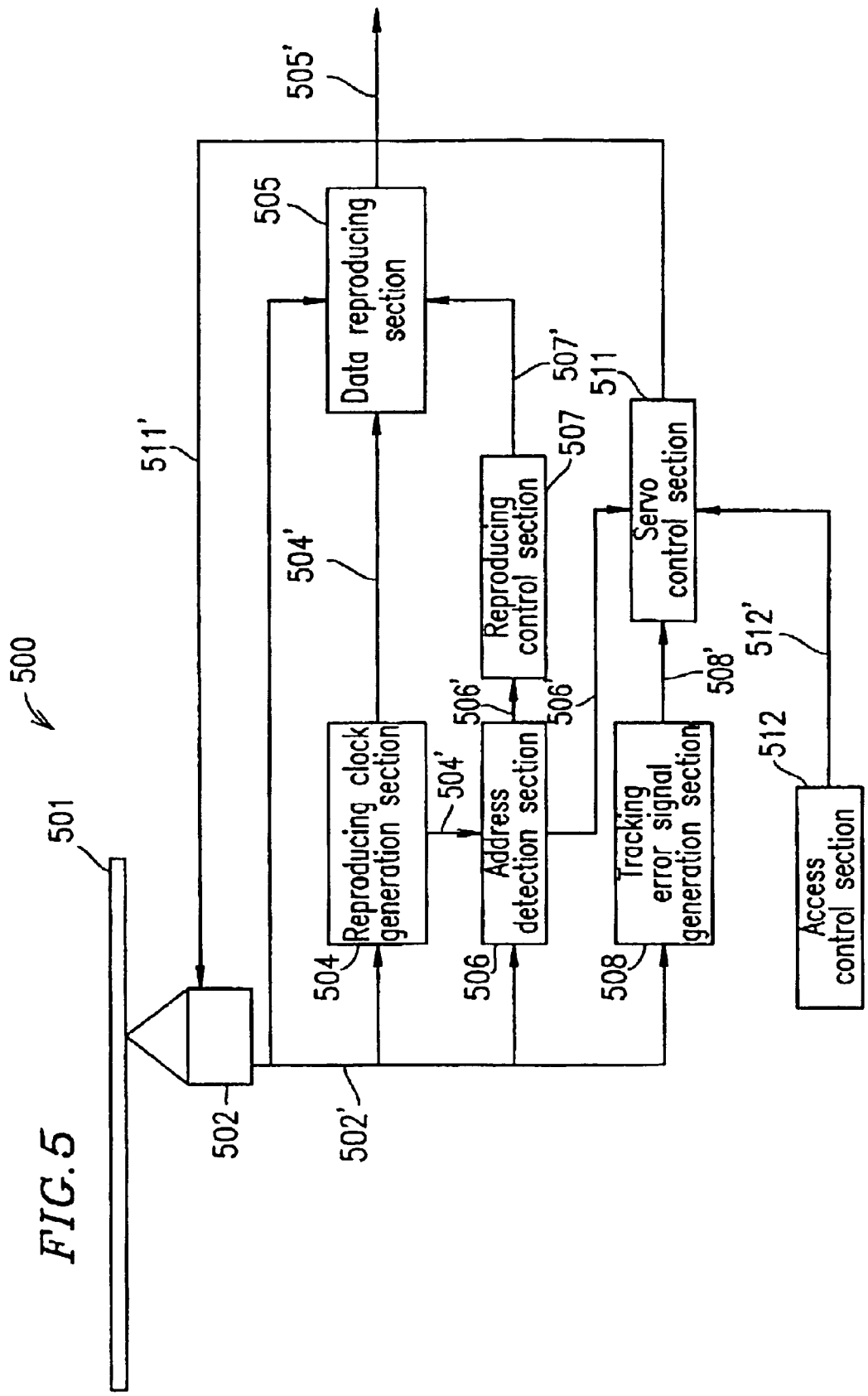
FIG. 5 is a block diagram illustrating a configuration of an optical disk reproducing device 500 according to an example of the present invention.

FIG. 5 is a block diagram of the optical disk reproducing device 500 of the present invention. The optical disk reproducing device 500 includes a head unit 502 which is a transducer means, a reproducing clock generation section 504, a data reproducing section 505, an address detection section 506, a reproducing control section 507, a tracking error signal (TES) generation section 508, a servo control section 511, and an access control section 512.

With reference to FIG. 5, a light beam emitted from the head unit 502 is reflected on an optical disk 501. The head unit 502 outputs a signal 502' which is in accordance with the reflected light from the optical disk 501. The optical disk 501 is identical to the optical disk 110. The TES generation section 508 outputs a TE signal 508' representing a deviation of a focusing spot of the light beam from the information track 201 or 202 based on the output (signal 502') of the head unit 502. The servo control section 511 controls the head unit 502 and the focal lens (not shown) mounted on the head unit 502 based on the TE signal 508' output from the TE signal generation section 508 so that the focusing spot of the light beam is positioned in the information tracks 201 or 202.

The reproducing clock generation section 504 generates the reproducing clock 504' based on the output of the head unit 502 (signal 502'). The address detection section 506 detects an address on the optical disk 501 as an address signal 506' based on the signal 502' and reproducing clock signal 504' respectively output from the head unit 502 and the reproducing clock generation section 504. The data reproducing section 505 reproduces data on the optical disk 501 based on the signal 502', the reproducing clock signal 504', and the signal 507' respectively output from the head unit 502, reproducing clock generation section 504', and the reproducing control section 507. The reproducing control section 507 controls the reproducing operations of the data reproducing section 505.

Figure 6:
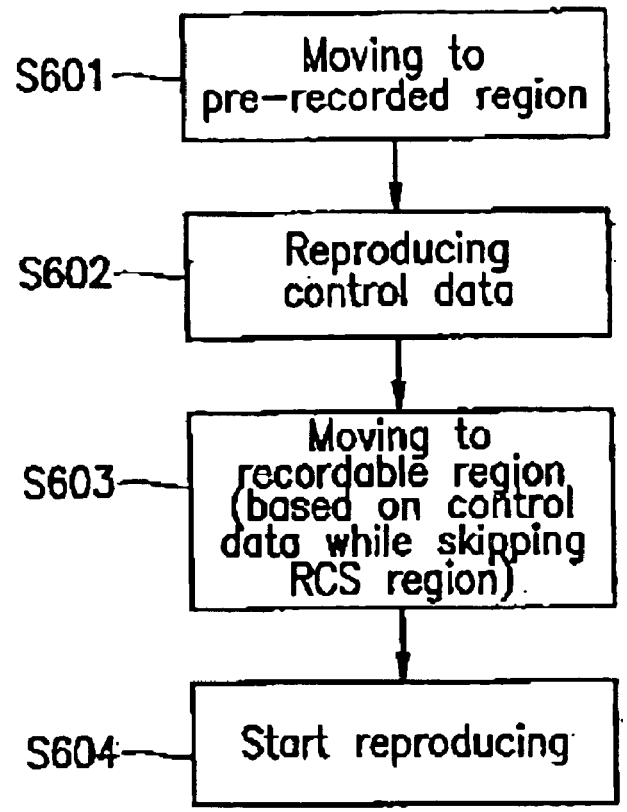
FIG. 6 is a flowchart illustrating a reproducing operation for an optical disk according to Example 3 of the present invention.
Figure 7:
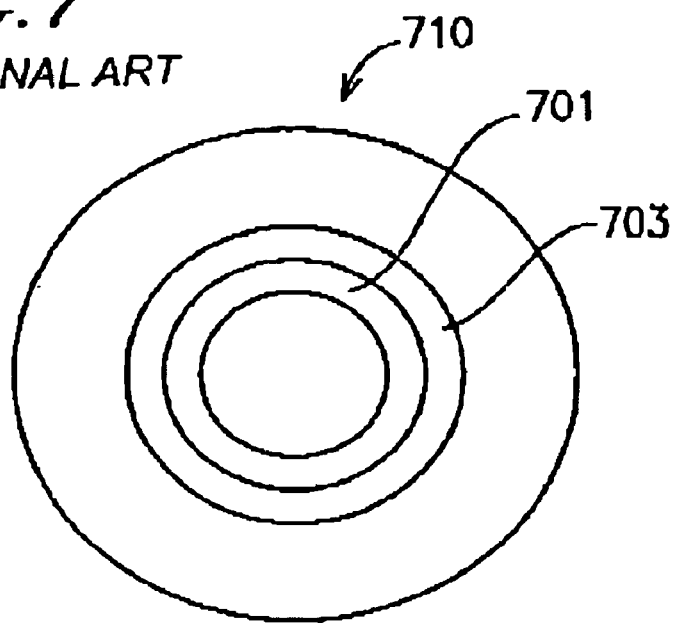
FIG. 7 illustrates a structure of a conventional optical disk 710.
Figure 8A:
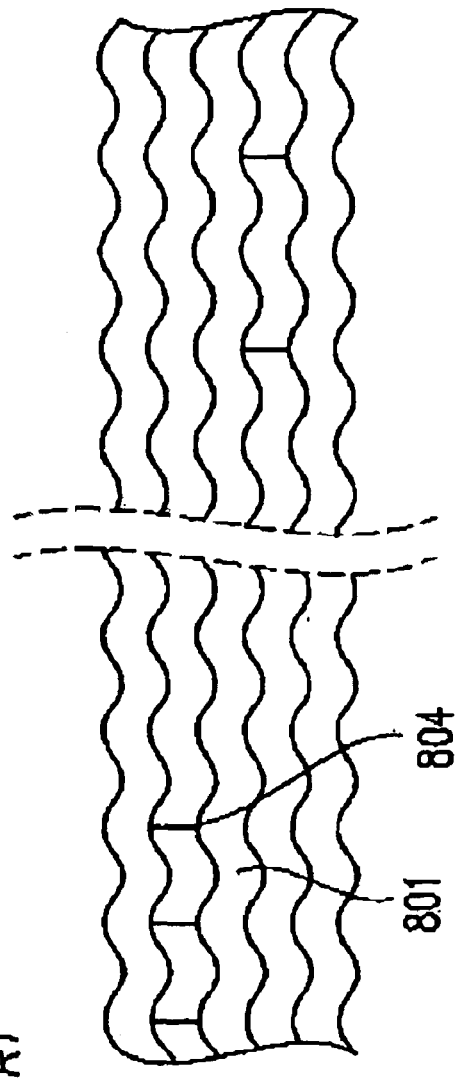
FIG. 8A illustrates information tracks in a pre-recorded region 701 of the conventional optical disk 710.
Figure 8B:
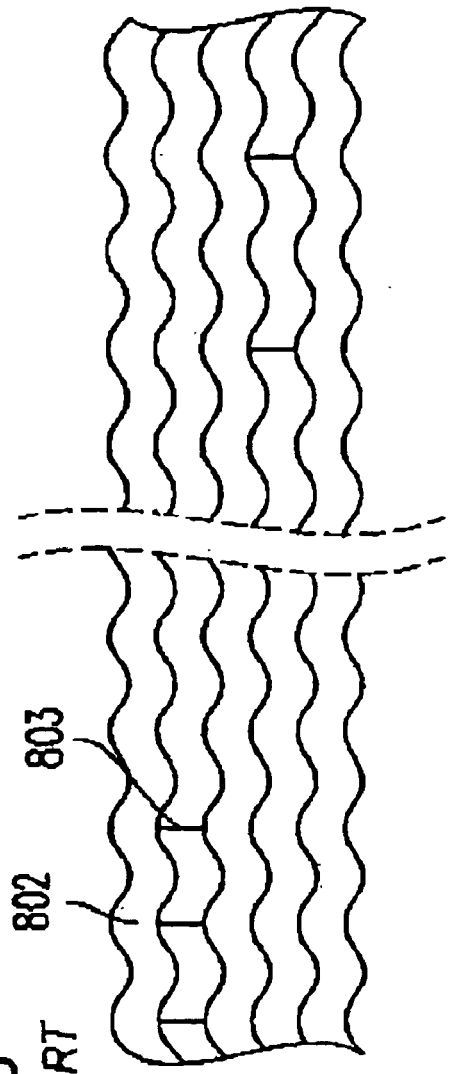
FIG. 8B illustrates information tracks in a recordable region 703 of the conventional optical disk 710.
Figure 9:
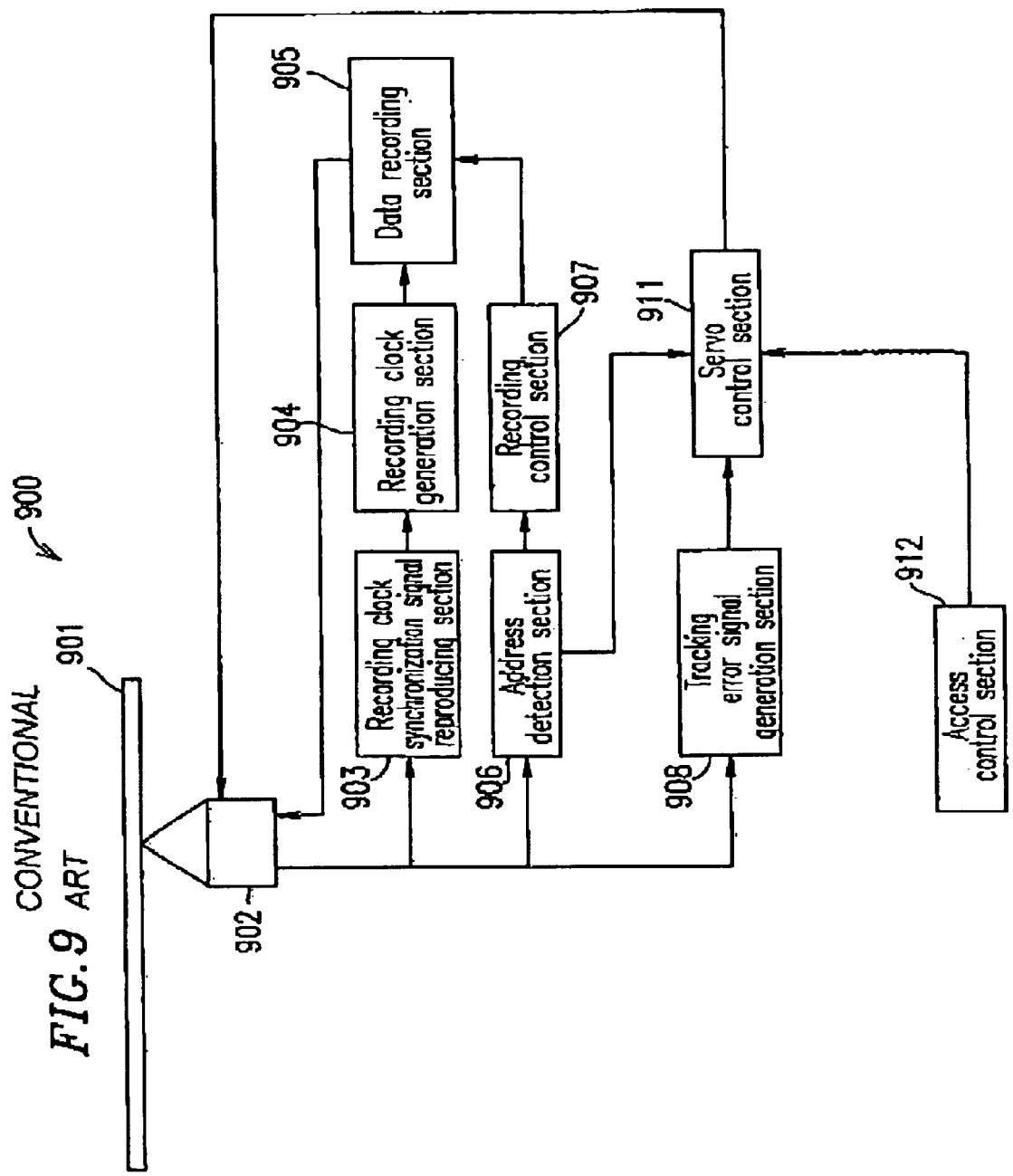
FIG. 9 is a block diagram illustrating a configuration of a conventional optical recording device 900.
Figure 10:
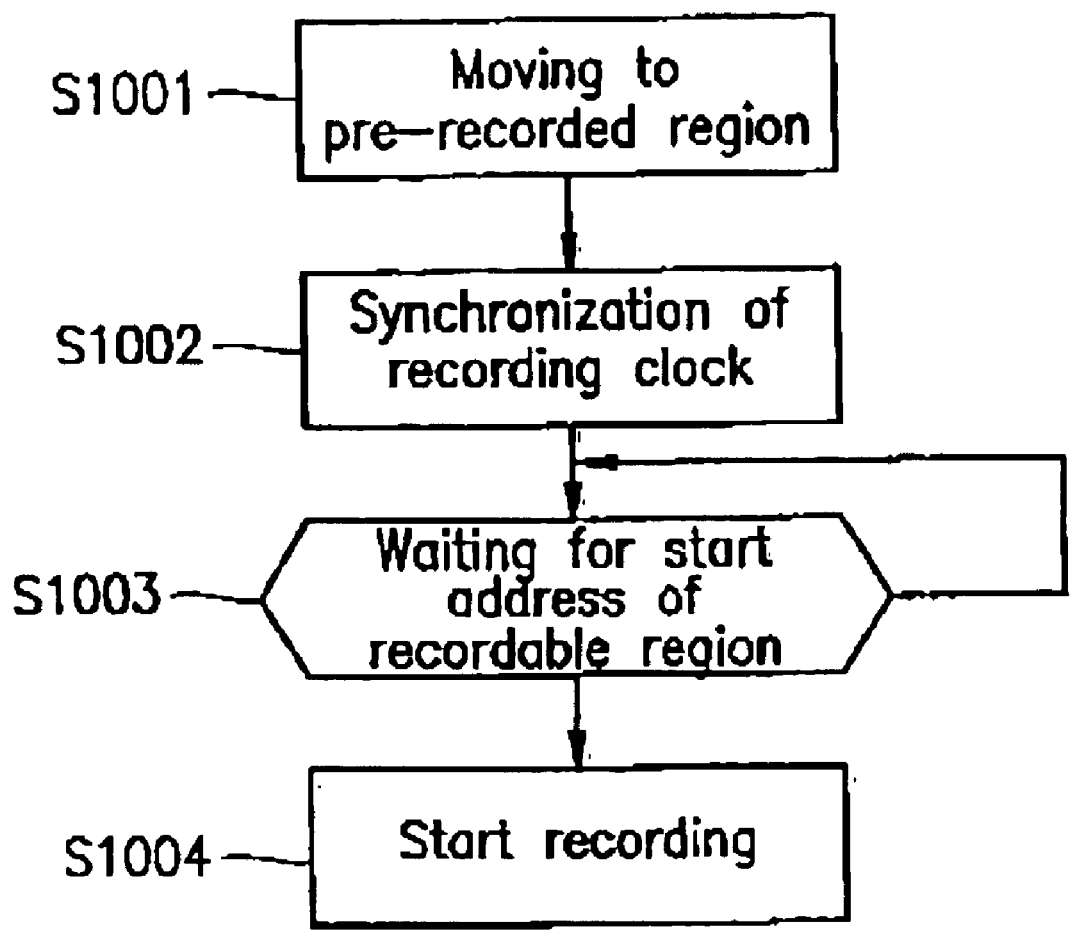
FIG. 10 is a flow chart illustrating a recording operation for a conventional optical disk.

FIG. 6 is a flow chart showing the operation of reproducing the recordable region 103 positioned after the pre-recorded region 101 of the optical disk 501.

In order to reproduce information recorded in the optical disk 501, at step S601, an access control section 512 sends to a servo control section 511 an instruction (signal 512') to access the pre-recorded region 101 illustrated in FIG. 1. The head unit 502 is moved along a radius direction of the optical disk 501 according to the instruction from the servo control section 511 (signal 511') so as to position the focusing spot of the light beam in the pre-recorded region 101 of the optical disk 501. At this point, the servo control section 511 controls the focusing spot of the light beam so as to be positioned in the information track 201 in the pre-recorded region 101 based on the output (signal 508') of the TES generation section 508.

At step S602, the control data 1105 in the pre-recorded region 101 is reproduced. At step S603, the focusing spot of the light beam is moved to the recordable region 103 based on the control data 1105 while skipping the RCS region 102. Data recorded on the RCS region 102 is not reproduced.

After the focusing spot has been moved to the recordable region 103, at step S604, the reproducing clock is synchronized with the output of the head unit 502 at the reproducing clock generation section 504. The address detection section 506 detects an address from the reproducing clock signal 504' and the output of the head unit 502 (signal 502'). When the focusing spot of the light beam has reached the user data region provided in the recordable region 103, the reproducing control section 507 outputs the signal 507' to the data reproducing section 505 based on the address signal 506' output from the address detection section 506. The data reproducing section 505 generates the reproducing data 505' based on the output of the head unit 502 and the reproducing clock based on the output (signal 507') of the reproducing control section 507 and outputs the reproducing data 505' so as to reproduce the data in a portion of the recordable region 103.

In the above-described case, even if the RCS region 102 is provided between the pre-recorded region 101 and the recordable region 103, the RCS region 102 may be skipped. Therefore, the recordable optical disk 501 can be stably reproduced even by a read only optical disk reproducing device.

For moving the focusing spot of the light beam so as to skip the RCS region 102, the driving of the head unit 502 may be timed so as to move the focusing spot across the RCS region 102, without utilizing the TE signal 508'. Thus, the RCS region 102 can be skipped. Therefore, in the read only optical disk reproducing device using only the PDTE signal, the focusing spot can stably move across the RCS region 102.

When moving the focusing spot across the RCS region 102, the PPTE signal may be used instead of the TE signal 508', so that it becomes to know how the focusing spot of the light beam is moving in the RCS region 102, thereby realizing stable operations.

In the case where the start position of the data region of the optical disk 501 is the same as that of the data region of a predetermined read only optical disk, the optical disk 501 can be accessed in the same procedures for the read only optical disk.

INDUSTRIAL APPLICABILITY

Thus, in accordance with an optical disk of the present invention, an RCS region where data recording is not performed is provided between a pre-recorded region and a recordable region so that data can be stably recorded from a beginning portion of the recordable region.

In an optical disk recording device according to the present invention, when recording information on the optical disk including an RCS region where data recording is not performed between a recorded region and a recordable region, data may be recorded on the recordable region after synchronization with the recording clock is established while reproducing information in the RCS region. Thus, data can be stably recorded from the beginning portion of the recordable region.

In a read only optical disk reproducing device according to the present invention, when reproducing information recorded on the optical disk including an RCS region where data recording is not performed between a pre-recorded region and a recordable region, information in the RCS region may not be reproduced. Thus, information recorded on the optical disk can be stably reproduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk, comprising:
   a pre-recorded region in which pre-recorded data is recorded;
   a recordable region in which a first clock synchronization mark and first address information are recorded; and
   a synchronization region positioned between the pre-recorded region and the recordable region, the synchronization region having a prescribed length,
   wherein the pre-recorded region is adjacent to an internal circumference of the optical disk, and the recordable region is adjacent to a periphery of the optical disk.

2. An optical disk according to claim 1, wherein in the synchronization region, a second clock synchronization mark and second address information, which are respectively identical in structure to the first clock synchronization mark and the first address information, are recorded.

3. An optical disk according to claim 1, wherein:
   in the synchronization region, a second clock synchronization mark which is identical in structure to the first clock synchronization mark is recorded; and
   the synchronization region is adapted for synchronizing a recording clock with a reproducing signal of the second clock synchronization mark, the recording clock being adapted for recording data in the recordable region.

4. An optical disk according to claim 1, wherein a width of the synchronization region along a radius direction is equal to or greater than that of a region including four information tracks of the optical disk along a radius direction.

5. An optical disk according to claim 1, wherein the pre-recorded data in the pre-recorded region comprises information indicating prescribed properties of the optical disk.

6. An optical disk according to claim 1, wherein the recordable region comprises:
   a data region in which data is to be recorded; and
   a buffering region positioned between the pre-recorded region and the data region.

7. An optical disk according to claim 6, wherein a start address of the data region in the recordable region is identical to a start address of a data region in a predetermined read only optical disk.

8. An optical disk according to claim 7, wherein a start address of the buffering region in the recordable region is identical to a start address of a buffering region in the predetermined read only optical disk.

9. An optical disk according to claim 7, wherein a start address of the buffering region in the recordable region lies more internally than a start address of a buffering region of the predetermined read only optical disk.

10. An optical disk according to claim 6, wherein a radial start position of the data region in the recordable region is identical to a radial start position of a data region of a predetermined read only optical disk.

11. An optical disk according to claim 10, wherein a radial start position of the buffering region in the recordable region is identical to a radial start position of a buffering region of the predetermined read only optical disk.

12. An optical disk according to claim 10, wherein a radial start position of the buffering region in the recordable region lies more internally than a radial start position of a buffering region of the predetermined read only optical disk.

13. An optical disk device, comprising:
   a transducer means for reproducing first information from an optical disk and for recording second information on the optical disk,
   wherein the optical disk includes a pre-recorded region in which pre-recorded data is recorded, a recordable region in which a clock synchronization mark and address information are recorded, and a synchronization region having a prescribed length positioned, and being between the pre-recorded region and the recordable region,
   wherein the first information comprises a clock synchronization mark recorded in the synchronization region,
   and wherein the transducer means is adapted to convert the clock synchronization mark into a clock synchronization signal and output a first signal including the clock synchronization signal;

a control section for controlling the transducer means;

a clock synchronization signal reproducing section for extracting the clock synchronization signal from the first signal;

a record clock generation section for generating a recording clock signal which is in synchronization with the clock synchronization signal;

a data recording section for outputting to the transducer means a second signal corresponding to the second information which is in synchronization with the recording clock signal;

an address detection section for detecting an address signal from the first signal; and a recording control section for controlling the data recording section based on the address signal to control a recording start position and recording end position of the optical disk.

14. An optical disk device according to claim 13, wherein the control section is adapted to control tracking based on a phase difference tracking error signal during reproducing information recorded in the pre-recorded region and to control tracking based on a push-pull tracking error signal during reproducing information recorded in the synchronization region.

15. An optical disk device according to claim 13, wherein the pre-recorded region includes control data, and wherein the control section is adapted to switch the transducer means so as to reproduce or not reproduce information in the synchronization region based on the control data.

16. An optical disk device according to claim 13, wherein the pre-recorded region includes control data and the recording control section changes a recording start position of the recordable region based on the control data.

17. An optical disk device according to claim 13, wherein the pre-recorded region includes control data and the data recording section is adapted to perform, when a synchronization signal and an address signal are detected during reproduction of the control data, a synchronization operation during reproducing the control data.

18. An optical disk device, comprising: means for reproducing first information from an optical disk including a pre-recorded region in which pre-recorded data is recorded, a recordable region in which a clock synchronization mark and address information are recorded, and a synchronization region having a prescribed length positioned and being between the pre-recorded region and the recordable region, wherein the optical disk device is adapted so as not to reproduce second information recorded in the synchronization region, the pre-recorded region is adjacent to an internal circumference of the optical disk, and the recordable region is adjacent to a periphery of the optical disk.

19. An optical disk device according to claim 18, wherein the pre-recorded region includes control data, and wherein the optical disk device includes means for reproducing, after reproducing the control data, third information recorded in the recordable region by skipping the synchronization region based on the control data.

* * * * *